Sept. 6, 1955  E. F. HARRIS  2,717,036
AUTOMOBILE WINDOW SCREEN
Filed Nov. 4, 1952
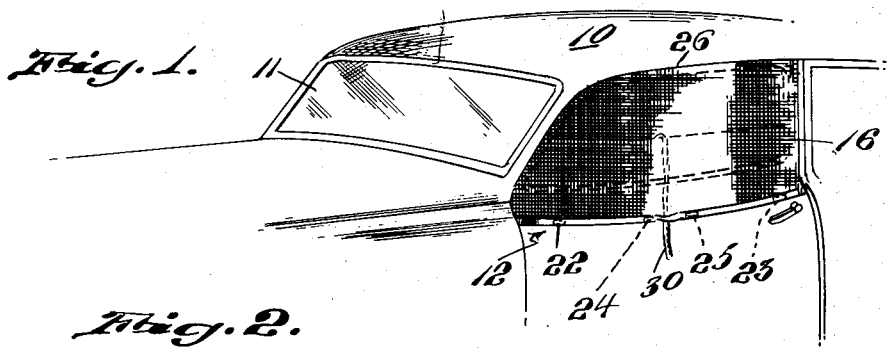
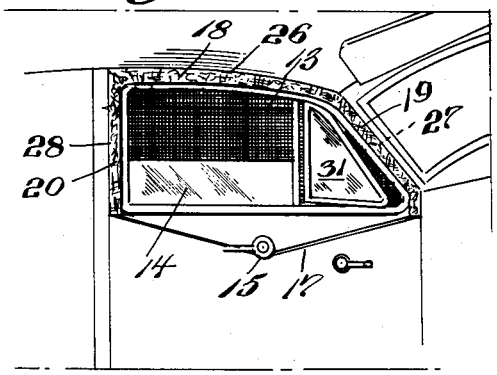
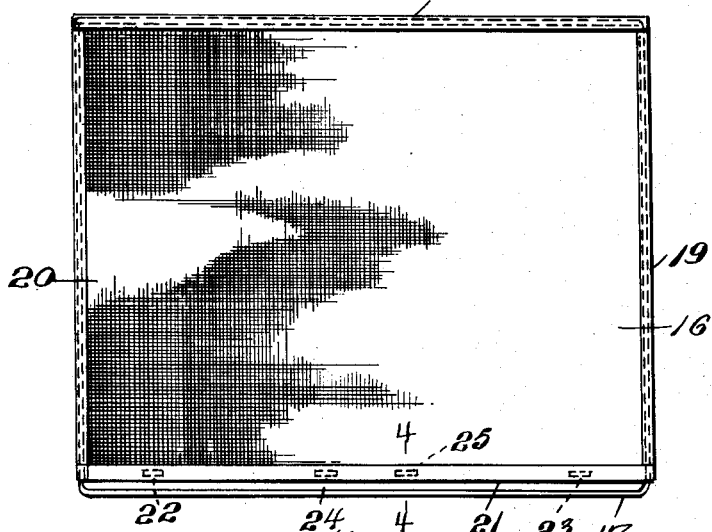
INVENTOR.
Estelle F. Harris
BY
Barlow & Barlow
ATTORNEYS.

United States Patent Office 2,717,036
Patented Sept. 6, 1955

2,717,036

AUTOMOBILE WINDOW SCREEN

Estelle F. Harris, Providence, R. I.

Application November 4, 1952, Serial No. 318,633

2 Claims. (Cl. 160—354)

This invention relates to the screening of an automobile window to keep out mosquitoes and other insects when the glass member which closes the opening in the door is removed from the opening or in open position.

An automobile when not in motion in the evening with a window open is frequently uncomfortable because insects enter through the open window in the door or other open window of the automobile.

One of the objects of this invention is to provide a screen for an open window of an automobile door which may be effectively positioned or removed from position as occasion may require.

Another object of the invention is to provide a screen which may be easily stored in the pocket of an automobile or in any other convenient place.

Another object of the invention is to utilize existing structure of the door for fastening a mosquito netting type screen in position.

With these and other objects in view, the invention consists of certain novel features of construction as will be more fully described and particularly pointed out in the appended claims.

In the accompanying drawings:

Figure 1 is a perspective view of a portion of an automobile showing a door equipped with my screen;

Figure 2 is a perspective view illustrating the inside of the door with the screen in position and showing the projecting means on the inner surface of the door which is utilized for fastening the screen;

Figure 3 is a front view of the screen alone; and

Figure 4 is a section on line 4—4 of Figure 3.

In proceeding with this invention, I utilize a mosquito netting which is of flexible character and dispose the same over the upper and side edge of the door with an elastic cord along these edges, which may be pulled upon to draw the mosquito netting tight across the outer surface of the door and at the upper edge thereof and then I hook this elastic cord beneath some projection on the inner surface of the door such as the crank for manipulating the glass member or window of the door or beneath an arm rest or some other projection. The lower edge of the mosquito netting on the outer surface of the door is equipped with magnets which will weight the lower edge to keep the mosquito netting taut and will so adhere to the steel door as to prevent the mosquito netting from being dislodged from its closing position. The magnets may be placed in such position that a cord may be led into the automobile so that when used in an outdoor moving picture theater, the mosquito netting may be kept taut about the cord for the loud speaker which leads into the automobile.

With reference to the drawings, 10 designates generally an automobile having a fixed windshield 11 and a door designated generally 12. This door is provided with an opening at 13 in its upper portion with a glass member or window 14 which may be manipulated up and down by a crank handle 15 to close or open the opening 13.

My screen is designated generally 16 and is shown as of rectangular formation with a flexible elastic cord 17 hemmed into the upper or top edge 18 and the side edges 19, 20, while sewed into the lower or bottom edge 21 there are four magnets, 22 and 23 near the juncture of the bottom and sides and 24 and 25 near the center but spaced apart a little greater than the width of an electrical conducting cord for a purpose to be hereinafter described.

This screen is positioned on the door 12 by having its upper edge 18 extend over the top edge 26 and its side edges 19 and 20 extend over the sides 27 and 28 of the door. The elastic cord 17 is drawn taut and stretched beneath the handle 15 so as to hold these edges snugly about the door and with the screen stretched taut from side to side and prevented from dropping from the top by the lapping-over of the top edge. The magnets 22 to 25 lie along the outer surface of the door and so weight the mosquito netting as to draw it taut from its upper edge which is secured, while they will adhere to the steel door and prevent the mosquito netting from blowing inwardly or outwardly by any wind which may occur at the time of use.

One of the uses of this mosquito netting is for an automobile while used in an open air theater for viewing the moving picture screen, the magnets 24 and 25 located closely together near the middle of the lower edge so that the loud speaker cord 30 may extend between these magnets and into the car for listening to the audio portion of the program, while the magnets keep the mosquito netting about the cord 30 to prevent the entrance of mosquitoes or other bugs.

The mosquito netting takes up so little room that the door may be closed or open at will with the netting in place. Likewise, the mosquito netting will permit of the window being run up or down while still in place, which might be convenient should a rain shower occur. Also the wing portion 31 of the window may be swung outwardly a portion of its swinging movement, as there is sufficient give in the netting to permit of this operation.

I claim:

A screen for an automobile door having an opening therein and a projection from its inner surface below said opening comprising a flexible open mesh fabric of a size to extend over the outer face of the door with its top and side edges extending about the upper and side edges and across the entire thickness of the door and over the inner surface of the marginal edge of the door, a pocket formed along said upper and side edges by doubling the edge of the fabric back upon itself, an elastic cord in said pocket of a length to extend below said projection when under tension to draw and hold the said edges taut over said opening, and means attached to the lower edge of the fabric to secure the lower edge to the outer surface of the door below the door opening.

2. The screen set forth in claim 1 wherein the securing means are magnets.

References Cited in the file of this patent

UNITED STATES PATENTS

| 2,012,056 | Ruttenberg | Aug. 20, 1935 |
| 2,437,845 | Wyeth | May 16, 1948 |
| 2,489,901 | Kocinski | Nov. 29, 1949 |
| 2,595,833 | Flaherty | May 6, 1952 |
| 2,624,406 | Szychowski | Jan. 6, 1953 |
| 2,665,754 | Claussen et al. | Jan. 12, 1954 |